United States Patent
Roosendaal et al.

(10) Patent No.: US 7,515,232 B2
(45) Date of Patent: Apr. 7, 2009

(54) ARRANGEMENTS IN A TRANSFLECTIVE LIQUID CRYSTAL DISPLAY WITH PATTERNED OPTICAL FOIL

(75) Inventors: Sander Jurgen Roosendaal, Eindhoven (NL); Johannes Albertus Matthijs Maria Van Haaren, Eindhoven (NL)

(73) Assignee: Sumitomo Chemical Co., Ltd., Tokyo (JP)

( * ) Notice: Subject to any disclaimer, the term of this patent is extended or adjusted under 35 U.S.C. 154(b) by 639 days.

(21) Appl. No.: 10/799,801

(22) Filed: Mar. 12, 2004

(65) Prior Publication Data

US 2004/0174480 A1    Sep. 9, 2004

(51) Int. Cl.
  *G02F 1/1335* (2006.01)
(52) U.S. Cl. .................. 349/119; 349/120; 349/121; 349/117; 349/118; 349/96; 349/100; 349/101; 349/102; 349/103; 349/105
(58) Field of Classification Search ......... 349/117–121, 349/96, 100–103, 105, 194
See application file for complete search history.

(56) References Cited

U.S. PATENT DOCUMENTS

| | | | | |
|---|---|---|---|---|
| 5,518,652 A | * | 5/1996 | Parri et al. | 252/299.01 |
| 5,619,352 A | * | 4/1997 | Koch et al. | 349/89 |
| 5,795,682 A | * | 8/1998 | Garza | 430/5 |
| 5,926,241 A | * | 7/1999 | Gunning, III | 349/117 |
| 5,928,819 A | * | 7/1999 | Crawford et al. | 430/20 |
| 6,046,849 A | * | 4/2000 | Moseley et al. | 359/465 |
| 6,239,853 B1 | * | 5/2001 | Winker et al. | 349/117 |
| 6,295,109 B1 | * | 9/2001 | Kubo et al. | 349/117 |
| 6,300,993 B1 | * | 10/2001 | Kuo et al. | 349/129 |
| 6,433,845 B1 | * | 8/2002 | Suzuki et al. | 349/102 |
| 6,567,141 B1 | * | 5/2003 | Kaneko et al. | 349/117 |
| 7,084,943 B2 | * | 8/2006 | Kubo et al. | 349/114 |

FOREIGN PATENT DOCUMENTS

JP    20002323610 A  * 11/2002
WO   WO-00/17707 A2    3/2000

* cited by examiner

*Primary Examiner*—David Nelms
*Assistant Examiner*—Hoan C Nguyen
(74) *Attorney, Agent, or Firm*—Birch, Stewart, Kolasch & Birch, LLP

(57) ABSTRACT

This invention relates to a transflective liquid crystal display device (11, 21), comprising a plurality of pixels, each comprising a liquid crystal layer (12, 22), being sandwiched between front and back electrode means (13, 23; 14, 24) as well as front and back polarizer means (17a, 27a; 17b, 27b). Said display device is characterized in that an optical λ/4 layer (16a, 26a) at least partly is arranged between said front polarizer (17a, 27a) and said liquid crystal layer (12, 22), and said liquid crystal layer (12, 22) is a liquid crystal layer having a twist angle essentially within a range ±80-100°, such as 90°. The invention further relates to methods for generating a quarterwave foil for use in a liquid crystal display as defined above.

12 Claims, 4 Drawing Sheets

ARRANGEMENTS IN A TRANSFLECTIVE LIQUID CRYSTAL DISPLAY WITH PATTERNED OPTICAL FOIL

The present invention relates to a transflective liquid crystal display device, comprising a plurality of pixels, each comprising a liquid crystal layer, being sandwiched between front and back electrode means as well as front and back polarizer means.

The invention also relates to a method of generating a patterned λ/4 (quarterwave) foil for use in a display as described above.

Due to its low power consumption, reliability and low price, liquid crystal displays, or LCDs have become the standard display choice for mobile applications, such as PDAs, laptops and cellular phones. However, the LCDs commonly used today have the disadvantages that they commonly exhibit low brightness, unsaturated colours, a limited viewing angle and/or low contrast. Consequently, it is expected that improved devices, such as active matrix reflective and transmissive LCDs will rapidly take over the market for mobile applications. Reflective LCDs are especially suited for outdoor use in direct sunlight. The contrast ratio is relatively low, compared with a transmissive display, and under poor illumination conditions, the brightness of this kind of display is low. On the other hand, transmissive LCDs have a good contrast ratio, but they become practically unreadable in direct sunlight illumination conditions. Furthermore, the transmissive display utilises a backlight, resulting in an increase of the power consumption.

Consequently, there is a need for a display having good display properties under all lighting circumstances. One solution is to use a so-called transflective LCD, which may be used in both a transmissive and reflective mode at the same time. The intensity of the backlight can thereby be tuned in order to fit the lighting conditions, either by hand, or automatically, using a photo diode or the like. This invention relates to an arrangement in a transflective liquid crystal display and a method for producing such a display.

The object of the present invention is to provide a transflective display having a high efficiency as well as an improved viewing angle dependency. A further object of the invention is to provide a transflective display having a high transmission for the bright state of the display.

These and other objects are achieved by a liquid crystal display device according to the introduction, being characterised in that an optical λ/4 layer at least partly is arranged between said front polarizer and said liquid crystal layer, and said liquid crystal layer is a liquid crystal layer having a twist angle essentially within a range ±80-100°, such as 90°. By this arrangement, a transflective display having a high contrast ratio reflective mode may be achieved. This construction results in a device having a steeper reflection/transmission-voltage curve than prior-art reflective LCD devices with a lower twist angle, resulting in a reduced voltage swing on the column drivers, which in turn reduces the power consumption of the inventive display. Furthermore, it is less sensitive to cell gap variations in the transmissive mode. Preferably, said optical λ/4 layer is a wide band λ/4 layer, providing a display with a better overall dark state, having an improved contrast ratio and an increased brightness.

In accordance with a first embodiment of the invention, wherein each of said pixels are subdivided into a reflective and a transmissive sub-pixel, respectively, whereby said optical λ/4 layer essentially only covers said reflective sub-pixels, thereby constituting a patterned λ/4 foil. This display has a relatively high transmission. Preferably, a cell gap of a transmissive sub-pixel is essentially larger than a corresponding cell gap for a reflective sub-pixel. The cell gap of the transflective sub-pixel may for example be 1.5-2.5 times bigger than the cell gap for the reflective sub-pixel, and preferably around 2 times bigger. Thereby the backlight efficiency of the display may be further improved, since the larger cell gap of the transmissive sub-pixels results in an exit polarisation state with a smaller ellipticity for the polarised light, and thereby an increased transmission.

In accordance with a second embodiment of the invention said back electrode means is a semitransparent reflecting electrode essentially covering the entire pixel area, being easy to realise by adding standard components.

The above-described objects are also in part achieved by three different methods for generating a patterned λ/4 foil for use in a display as described above.

In accordance with a first embodiment, the method comprises the following steps: depositing a reactive liquid crystal layer on a substrate, applying a mask, covering parts of the display corresponding to transmissive parts of the display, while revealing parts corresponding to reflective parts, and photo-polymerising said reactive liquid crystal layer, through said mask removing non-reacted liquid crystal material. This method has the advantage that the processing may be done at a single temperature, which reduces both the processing time and investments in equipment.

In accordance with a second embodiment, the method comprises the following steps: depositing a reactive liquid crystal layer on a substrate, appplying a mask, covering parts of the display corresponding to transmissive parts of the display, while revealing parts corresponding to reflective parts, performing a first photo-polymerisation exposure of said reactive liquid crystal layer, while keeping the reactive liquid crystal layer at a first temperature, performing a second photo-polymerisation exposure of the reactive liquid crystal layer, while keeping the reactive liquid crystal layer at a second temperature, whereby one of said photo-polymerisation exposures are made through a mask, being applied on said reactive liquid crystal layer. This method has the advantage that LC material above the transmissive sub-pixel that has not reacted in the photo-polymerisation process described in said first embodiment, need not be removed. Preferably, said first and second temperatures is so chosen that the reactive liquid crystal layer is in a nematic liquid crystal phase at said first temperature, and at a temperature above a clearing point of said liquid crystal material.

In accordance with a third embodiment, the method comprises the following steps: depositing a reactive liquid crystal layer on a substrate, and providing a patterned orientation layer, corresponding to the desired patterned λ/4 foil. The orientation of the λ/4 foil above the transmissive sub-pixel is suitably parallel with either the transmissive or the absorbing axis of a front polariser. Preferably, said patterned orientation layer is generated by means of photo alignment. This method is advantageous in that photo-alignment as such is a rather simple and well-tested method. Furthermore, no mask is needed in the polymerisation of the reactive LC material.

A currently preferred embodiment of the present invention will now be described in closer detail, with reference to the accompanying drawings.

Figure 1:
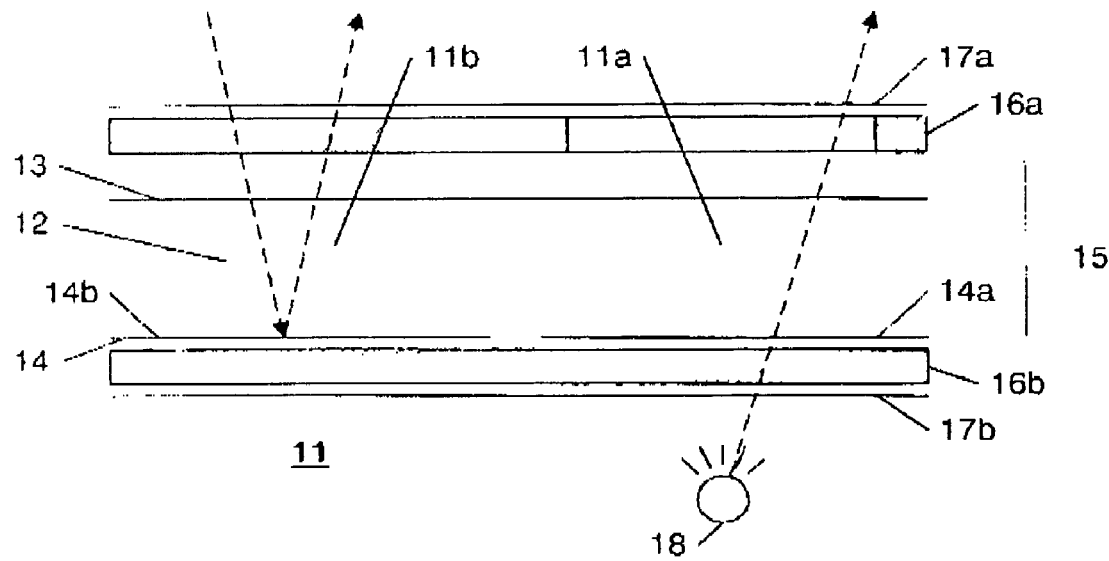
FIG. 1 is a schematic cross section drawing of a single pixel of a transflective display with sub-pixelation.
Figure 2:
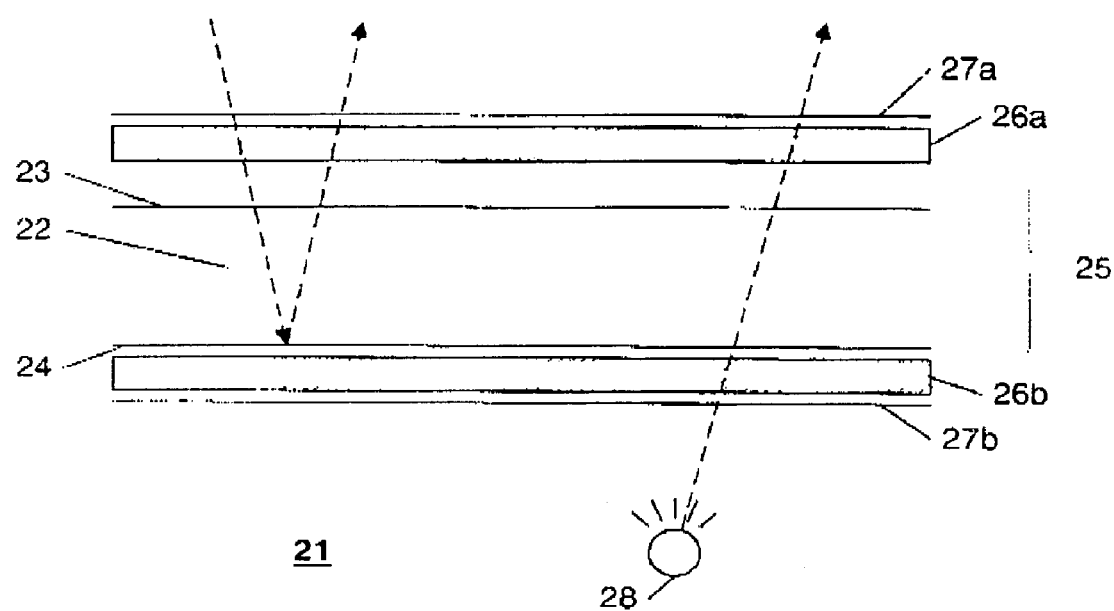
FIG. 2 is a schematic cross section drawing of a single pixel of a transflective display with a half-transmissive mirror.

In FIG. 1 and FIG. 2, transflective liquid crystal display arrangements in accordance with a first and a second embodiment of the invention are shown. A transflective display device is a display that might be driven in a reflective mode and/or a transmissive mode. The display 11, 21 in accordance with FIG. 1 or 2 comprises a liquid crystal layer 12, 22, in the present embodiments a twisted nematic liquid crystal layer, being sandwiched between a transparent front electrode 13, 23 and a back electrode 14, 24. Furthermore, on per se known manner, orientation layers (not shown) are arranged on said electrodes 13,23; 14,24 in order to induce an equilibrium orientation as well as twist and pre-tilt angles of the liquid crystal material layer 12, 22. Said display 11, 21 is subdivided into a plurality of pixels, whereby FIGS. 1 and 2 schematically show one such pixel.

In a first embodiment, as shown in FIG. 1, each pixel is subdivided into a first and a second sub-pixel 11a, 11b, respectively, not necessarily having the same area, whereby said first sub-pixel 11a may be referred to as a transmissive sub-pixel, while said second sub-pixel 11b may be referred to as a reflective sub-pixel. Each first sub-pixel 11a contains a first back electrode part 14a, being transparent, e.g. manufactured from ITO, and each second sub-pixel comprises a second back electrode part 14b, being combined with a reflector, such as an aluminium foil or the like. Said first electrode part 11a consequently defines a transmitting pixel part, and said second electrode part 11b defines a reflective pixel part. Together, said liquid crystal layer 12 and said electrodes 13, 14 constitute a liquid crystal cell 15.

Further, the liquid crystal cell is sandwiched between a front optical foil 16a and an optional back optical foil 16b. The front optical foil 16a is a quarterwave foil, being essential for the reflective sub-pixel, and the back optical foil is arranged to eliminate the function of said front optical foil 16b for the transmissive sub-pixels for a dark state of the display. In accordance with a preferred embodiment (not shown) said front optical foil 16a is a wide band quarterwave foil, essentially comprising a quarterwave and a halfwave retarder, whereby a display with a better overall dark state, having an improved contrast ratio and an increased brightness is provided. Moreover, on the viewer side of the device a front polarizer 17a is arranged, and on the backside, a back polarizer 17b and a backlight panel 18 is arranged, as seen in FIG. 1.

A second embodiment of the display device in accordance with the invention is shown in FIG. 2. In this case, each pixel comprises a liquid crystal layer 22 being sandwiched between a transparent front electrode 23, and a semitransparent reflecting back electrode 24. For example, said semitransparent reflecting back electrode 24 may contain a metallic reflector, being thin enough to transmit a certain part of the incident light. Together, said liquid crystal layer and said electrodes constitute a liquid crystal cell 25. Said cell is sandwiched between a front optical foil 26a and a back optical foil 26b in accordance with the invention. This construction is thereafter placed between polarizers, i.e. a front polarizer 27a and a back polarizer 27b, and on the backside of said display device, a backlight panel 28 is arranged.

As described above, a front and a back optical foil 16a, 26a; 16b, 26b is arranged on opposite sides of the liquid crystal cell 15, 25. In order to achieve a high contrast ratio reflective mode of the display device, the transmission and reflection of a dark state of the display must be independent, or nearly independent, of the wavelength of the light. The reflection of the display is determined by a parameter P:

$$P = d\Delta n/\lambda \quad (1)$$

where d is the total thickness of the liquid crystal layer, and any foil, $\Delta n$ is the refraction index anisotropy of the liquid crystal material and $\lambda$ is the wavelength of the incident light. It is known that, if the dark state of the configuration occurs when the directors of the liquid crystal layer 12, 22 are parallel with the electric field applied to the cell, by putting a voltage over the electrodes, this reduces the wavelength dependence of the cell. Therefore, optical modes having a dark state at high electric fields give a better contrast ratio than optical modes for which the reflection/voltage curve goes through a minimum at a certain voltage. Such optical modes are obtainable by arranging a quarterwave foil or a wideband quarterwave foil as the case may be, between the front polarizer and the liquid crystal layer.

Figure 3:
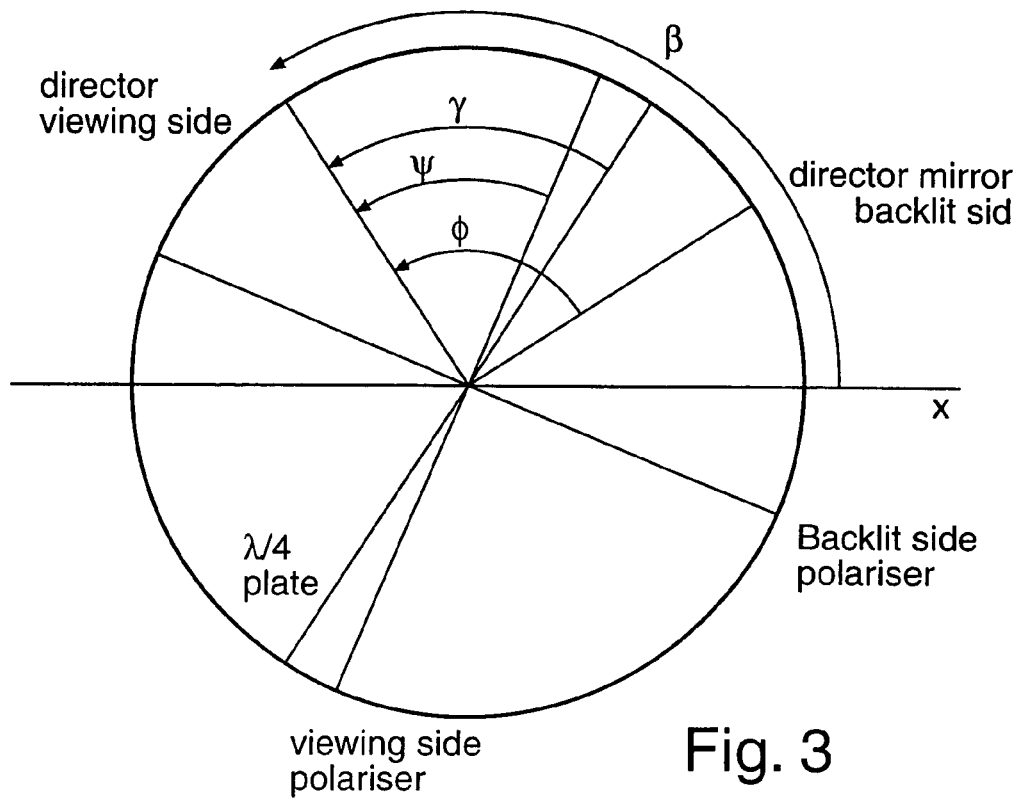
FIG. 3 is a diagram showing the relative orientation of the director on the viewing side of the display, the directors on the backside of a liquid crystal cell, the optical axis of a quarterwave foil and the polarisation of the light incident on the display.

Furthermore, to reduce the voltage swing on the column drivers, which in turn reduces the power consumption of the display, the reflection/voltage curve needs to be steep. This may be achieved by increasing the twist angle of the liquid crystal material. However, a higher twist angle results in a smaller region of viewing angles, under circumstances when the contrast is high. Furthermore, the contrast ratio of a transmissive display is at a maximum when the polarizers are placed perpendicularly. Consequently, optical modes having a twist angle of ±90° are to prefer. A diagram showing the relative orientation of the director on the viewing side of the display, the directors on the backlit side of the cell, the optical axis of the quarterwave retarder foil and the polarisation of the incident light on the display is shown in FIG. 3.

It may be shown that for liquid crystal twist angles between $\pi/2$ and $\pi$, the highest brightness of the display in an undriven state is obtained when the angle $\gamma$ of the slow axis of the quarterwave foil, with respect to the viewing side director $\psi$ is given by:

$$\gamma = -\arccos\left(-\sqrt{\frac{1}{2} - \frac{\sqrt{1-\cos(4\psi)}}{2\sqrt{2}}}\right) + m\frac{\pi}{2} \quad (2)$$

where m is an arbitrary integer.

Furthermore, this brightness in the non-addressed state is maximal when said twist angle $\phi$ is given by:

$$\frac{\phi}{\pi} = \frac{1}{2} + \frac{\arcsin(\sin(2\psi))\csc(\psi)\sec(\psi)\sqrt{\sin(2\psi)^2}}{2\pi} \quad (3)$$

It follows from the above that $\phi=\pi/2$ for $\psi=0$ and $\psi=\pm\pi/2$. These modes provide a maximum reflection at $d\Delta n/\lambda=0.44$. Thereby, a display having a high brightness in its bright state may be obtained by certain combinations of twist angles and cell gap for the liquid crystal layer.

Regarding the transmissive mode, there are basically two different ways of achieving this at high voltages.

As described above, the preferred twist angle of the liquid crystal layer 12, 22 is $\pm 90°$. Further fine-tuning of the twist angle (between essentially 80-100°) is possible in order to improve the contrast ratio and grey-scale inversion at larger viewing angles. A simple way of achieving a standard 90° twisted nematic transmissive cell 15 is by removing the above-described quarterwave foil 16a on the front side, and adding a polarizer on the backside 17b, which is perpendicular to said front polarizer. This embodiment, as shown in FIG. 1, requires the use of a patterned quarterwave foil 16a, since the quarterwave foil only shall be removed at the transmissive parts of each pixel, while leaving the reflective parts unchanged. Methods of achieving such a foil is described below.

A second possibility to achieve a 90° twisted nematic transmissive cell is by adding an extra quarterwave foil 26b on the backlit side of the liquid crystal cell 25, said foil having its slow axis perpendicular to that of the quarterwave plate on the front side of the liquid crystal cell. The cell is also sandwiched between crossed polarizers 27a, 27b. This solution is usable for arrangements as shown in FIG. 2, and it is rather easy to achieve from a technological point of view, since it allows solutions without subdividing the pixels.

Figure 4:
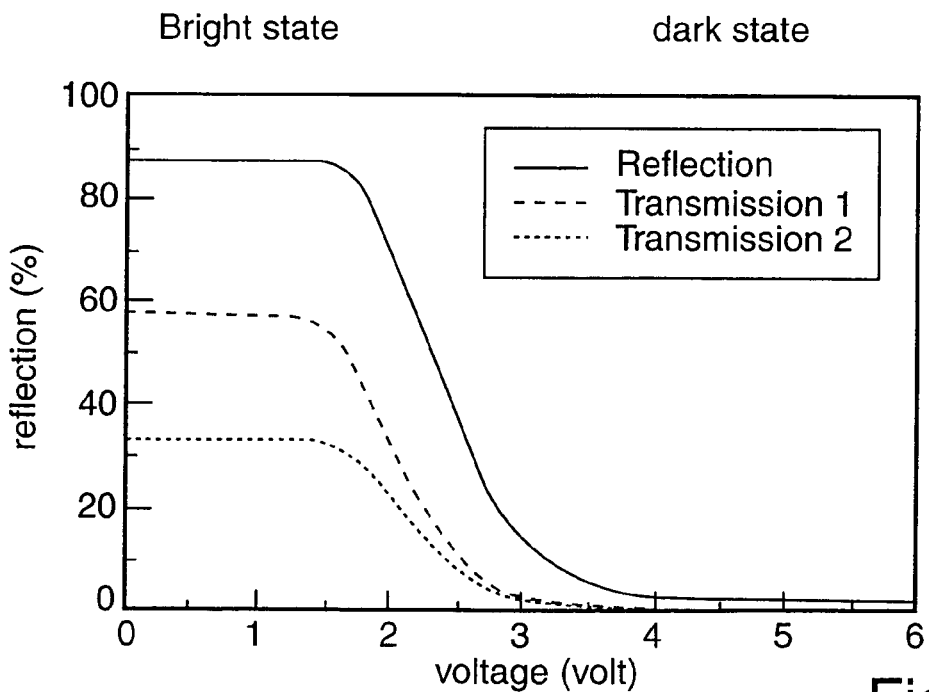
FIG. 4 is a diagram showing theoretical calculations of the reflection and transmission versus the voltage for transflective displays in accordance with the invention.

A comparison between the two above-described transmissive cells are shown in FIG. 4. In this figure the simulated reflection and transmission versus the applied voltage is plotted for both solutions. The calculations are made for a twisted nematic mode with $\psi=\pi/2$, $\phi=\pi/2$ and $\beta=0$, as seen in FIG. 3. The illumination was standard white light for both the reflective and transmissive mode, and the curves are corrected for a standard observer. The plotted values are not dependent on the value of m in equation 2. As is evident from FIG. 4, the second solution, adding a second quarterwave foil as described above, has a lower transmission in the bright state. This means that the intensity of the backlight needs to be increased in order to obtain the same brightness as a display utilising the first solution. Consequently, the first solution provides for a lower power consumption of the liquid crystal display.

Figure 5:
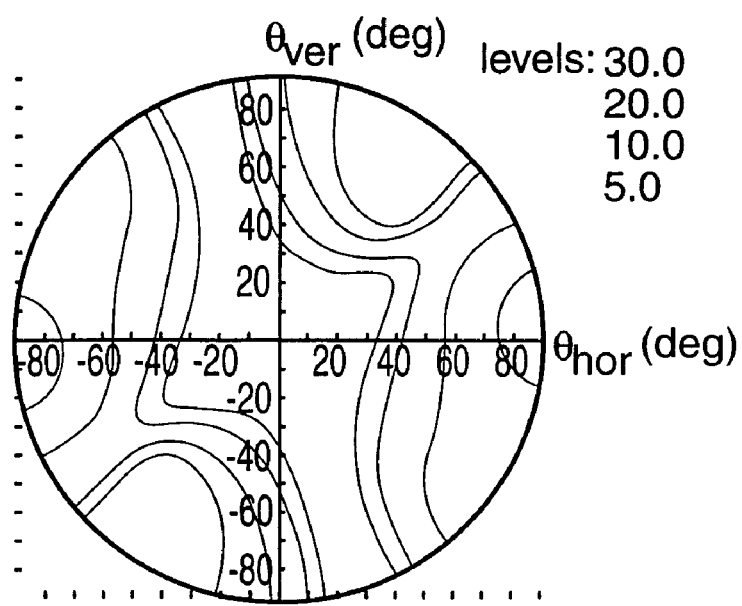
FIG. 5 is a diagram showing the angular dependence of the contrast ratio for the reflective part of a transflective display in accordance with the invention, for m=0.
Figure 6:
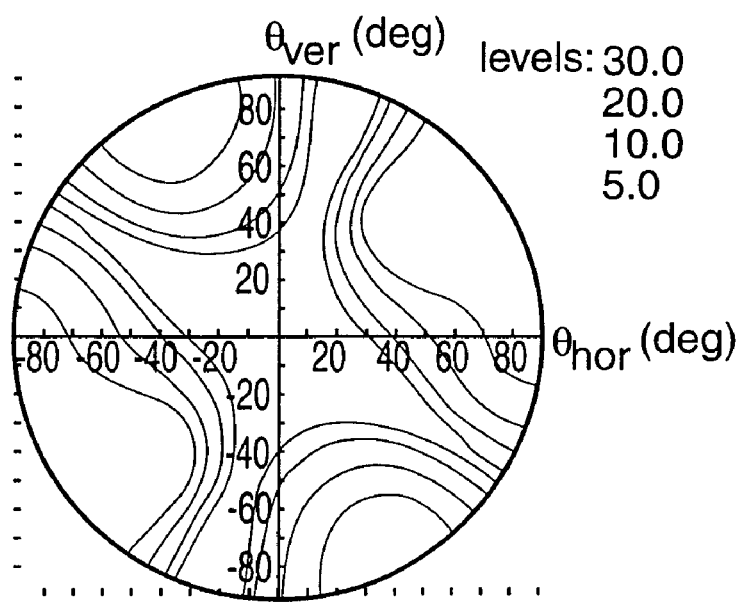
FIG. 6 is a diagram showing the angular dependence of the contrast ratio for the reflective part of a transflective display in accordance with the invention, for m=1.

Furthermore, FIG. 5 and FIG. 6 shows the angular dependency of the contrast ratio for the reflective mode, for m=0 and m=1 in equation 2, respectively. As may be seen from FIG. 5, the viewing angle for m=1, having the slow axis of the quarterwave foil perpendicular with a mid-plane director, seems to be slightly better.

Figure 7:
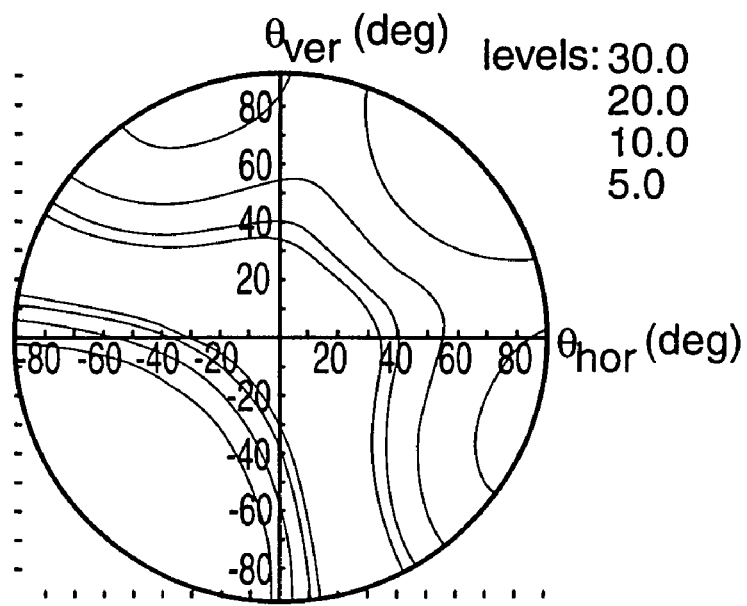
FIG. 7 is a diagram showing the angular dependence of the contrast ratio for the transmissive part of a transflective display in accordance with the invention, for a no quarterwave foil solution.
Figure 8:
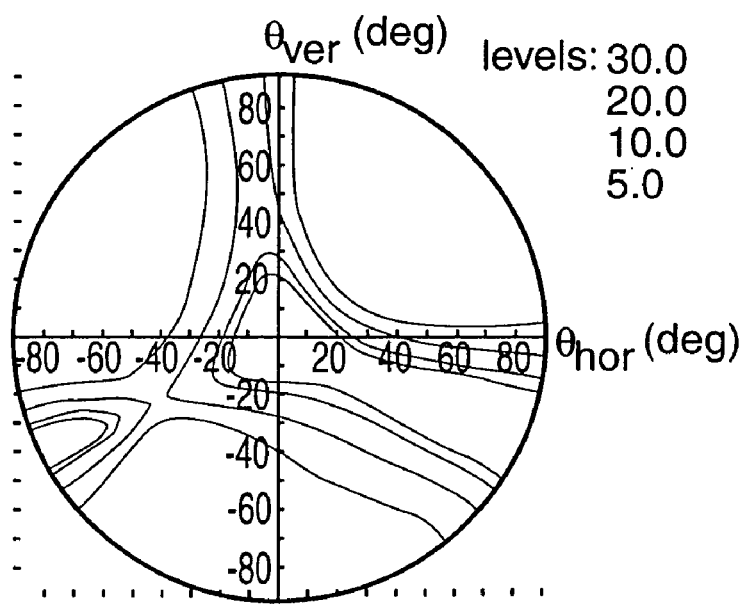
FIG. 8 is a diagram showing the angular dependence of the contrast ratio for the transmissive part of a transflective display in accordance with the invention, for a double quarterwave foil solution.

The viewing angle dependency of the contrast ratio of the transmissive mode is shown in FIGS. 7 and 8. The contrast ratio is independent of m for both solutions described above.

As may be seen from FIGS. 7 and 8, the viewing angle is much better for the first solution, shown in FIG. 7, having a patterned quarterwave foil, i.e. the transmissive light do not pass any quarterwave foil on its way to an observer.

Consequently, as shown above, although it is more difficult to obtain a patterned quarterwave foil, and this solution is restricted to transmissive displays with sub-pixels, there is a large gain in efficiency as well as viewing angle dependence.

A patterned quarterwave foil may be manufactured by photo-polymerisation of a reactive liquid crystal material. These materials get their orientation from thin polymer alignment films; similar to those used to orientate a liquid crystal layer. In accordance with the invention it is proposed to start from a film of reactive liquid crystal material having a planar orientation and a thickness corresponding to $d\Delta n=\lambda/4$ retardation. This results in a reflective liquid crystal layer having the functionality of a quarterwave retarder at positions when this is desired, i.e. in the reflective sub-pixels.

In accordance with the invention, there are three methods for locally modifying the above-described layer in order to not function as a quarterwave retarder at the transmissive parts of the display, i.e. at the transmissive sub-pixels.

A first method will be described hereinafter. Said reactive liquid crystal material layer is disposed on a substrate. Thereafter, a mask corresponding to the desired pattern is applied on said reactive LC layer, and photo-polymerisation is made through said mask, whereafter non-reacted liquid crystal material is removed locally, in order to obtain d=0 at those parts of the display where quarterwave functionality is not desired, i.e. at the transmissive parts of the display.

A second method will be described hereinafter. Said reactive liquid crystal layer is disposed on a substrate, whereafter the layer is exposed to two photo-polymerization exposures. One of said exposure is made through a mask as in the method. Furthermore, one exposure is done while keeping the liquid crystal material at a temperature at which the reactive liquid crystal material is in a nematic liquid crystal phase, and a second exposure is made at a temperature above the clearing point of the liquid crystal material. In this way, the reactive liquid crystal layer is patterned in areas having a birefringence $\Delta n\approx 0.1$ and areas with $\Delta n\approx 0$.

A third method will be described hereinafter. Here, the orientation of the liquid crystal material may be selectively changed. The part of the cell requiring a quarterwave foil is given a planar orientation at a 45° angle between the transmissive axis of the polarizer and the retarder. The part that should not get quarterwave functionality is either given a homeotropic orientation or a planar orientation that is parallel to the transmissive axis of the polarizer or parallel to the absorption axis of the polarizer. This is achievable by using a patterned orientation layer, for example generated by means of photo alignment.

A variation of the above method is to do a further optimisation of the display, by allowing some birefringence in the part of the retardation film in the transmissive parts of the pixels that should not have the functionality of a quarterwave foil. This can for example be achieved by defining an orientation in these parts of the layer that is not exactly parallel with one of the main axes of the polarizer, or by a local reduction of the birefringence of the liquid crystal layer to a small, but non-zero, value.

By using the above construction and methods, a transflective liquid crystal display may be produced, having a single cell gap, i.e. having equal cell gaps for the transmissive and reflective sub-pixels, and a single alignment layer. This makes the fabrication of a transflective display comparable and compatible with the kinds of LCD technology, that are currently used. For example, this construction eliminates the use of photo-alignment. Furthermore, the inventive display construction has a high contrast ratio, due to the fact that the transmission and reflection are independent of the wavelength of the light.

The solution using the patterned λ/4 foil provides a higher backlight efficiency and better viewing angle characteristics than the alternative solution using two separate λ/4 foils. The best performance is given with m=1, as seen in FIG. 6, the solution with the patterned foil and λ=λ/4 in order to insure a large viewing angle in the horizontal direction.

Consequently, a single gap transflective display is presented having a twist angle of 90°. The display may be equipped with reflective and transmissive sub-pixels. The transflective display may be operated in both modes at the same time, which results in a large increase of the usability of the display. By placing a λ/4 foil, or a wideband λ/4 foil as the case may be, between the polarizer and the liquid crystal layer, on the viewer side of the display, a 90° twisted nematic layer may be used.

It shall be noted that the reflective mode of the above-described displays essentially functions with only the front polarizer and using the reflecting back electrode as a mirror. In other prior-art transflective displays the reflector is located outside the liquid crystal cell, and the back polarizer is used in both the transmissive and reflective mode of the display.

The invention claimed is:

1. A method of generating a patterned λ/4 foil, comprising:
   depositing a reactive liquid crystal layer on a substrate;
   applying a mask, covering parts of the display corresponding to transmissive parts of a display, while revealing parts corresponding to reflective parts;
   photo-polymerizing said reactive liquid crystal layer, through said mask; and removing non-reacted liquid crystal material.

2. A method of producing a patterned optical foil, comprising:
   providing a film of reactive liquid crystal material;
   providing a pattern for processing the reactive liquid crystal material that defines first area segments and second area segments of the film; and
   processing the reactive liquid crystal material via the pattern to produce:
      a first optical retardation in the first area segments, and
      a second optical retardation in the second area segments;
   wherein the first optical retardation is configured to provide an optical twist in the range of 80 to 100 degrees, and the second optical retardation is configured to provide an optical twist at or near zero degrees; and
   wherein the processing of the reactive liquid crystal material via the pattern includes photo-polymerizing the reactive liquid crystal material in the first area segments, and substantially removing the reactive liquid crystal material from the second area segments.

3. A method of producing a patterned optical foil, comprising:
   providing a film of reactive liquid crystal material;
   providing a pattern for processing the reactive liquid crystal material that defines first area segments and second area segments of the film; and
   processing the reactive liquid crystal material via the pattern to produce:
      a first optical retardation in the first area segments, and
      a second optical retardation in the second area segments;
   wherein the first optical retardation is configured to provide an optical twist in the range of 80 to 100 degrees, and the second optical retardation is configured to provide an optical twist at or near zero degrees; and
   wherein the pattern corresponds to an orientation layer, and the processing of the reactive liquid crystal material via the pattern includes:
      orienting the reactive liquid crystal material at a first planar orientation, and
      orienting the reactive liquid crystal material at a second planar orientation that is substantially different from the first planar orientation.

4. The method of claim 3, wherein
   the first planar orientation differs from the second planar orientation by about 45 degrees.

5. A method of producing a patterned optical foil, comprising:
   providing a film of reactive liquid crystal material;
   providing a pattern for processing the reactive liquid crystal material that defines first area segments and second area segments of the film; and
   processing the reactive liquid crystal material via the pattern to produce:
      a first optical retardation in the first area segments, and
      a second optical retardation in the second area segments;
   wherein the first optical retardation is configured to provide an optical twist in the range of 80 to 100 degrees, and the second optical retardation is configured to provide an optical twist at or near zero degrees; and
   wherein the processing of the reactive liquid crystal material via the pattern includes:
      providing a first birefringence to the first area segments, and
      providing a second birefringence to the second area segments.

6. The method of claim 5, wherein the second birefringence is near zero.

7. A method of producing a patterned optical foil, comprising:
   providing a film of reactive liquid crystal material;
   providing a pattern for processing the reactive liquid crystal material that defines first area segments and second area segments of the film; and
   processing the reactive liquid crystal material via the pattern to produce:
      a first optical retardation in the first area segments, and
      a second optical retardation in the second area segments;
   wherein
   the first optical retardation is configured to provide an optical twist in the range of 80 to 100 degrees, and
   the second optical retardation is configured to provide an optical twist at or near zero degrees, wherein
   the first area segments and second area segments form pairs of segments that are arranged as a two-dimensional array of pairs of segments, and wherein
   the array of pairs of segments corresponds to an array of pixels of a display device.

8. A method of producing a patterned optical foil, comprising:
   providing a film of reactive liquid crystal material;
   providing a pattern for processing the reactive liquid crystal material that defines first area segments and second area segments of the film; and processing the reactive liquid crystal material via the pattern to produce:
a first optical retardation in the first area segments, and
a second optical retardation in the second area segments;
wherein
the first optical retardation is substantially different from the second optical retardation, and
each pair of first area segments and second area segments corresponds to a pixel of an array of pixels of a display device.

9. The method of claim 8, further including:
providing a pair of polarizers that sandwich the array of pixels to form the display device.

10. The method of claim 8, wherein
each pixel includes electrodes that are configured to control the liquid crystal material.

11. The method of claim 8, wherein
the first optical retardation is configured to provide an optical twist in the range of 80 to 100 degrees, and
the second optical retardation is configured to provide an optical twist at or near zero degrees.

12. The method of claim 8, wherein
the first optical retardation is substantially determined by a thickness of the patterned optical film.

* * * * *

UNITED STATES PATENT AND TRADEMARK OFFICE
CERTIFICATE OF CORRECTION

PATENT NO.        : 7,515,232 B2
APPLICATION NO.   : 10/799801
DATED             : April 7, 2009
INVENTOR(S)       : Sander Jurgen Roosendaal et al.

It is certified that error appears in the above-identified patent and that said Letters Patent is hereby corrected as shown below:

On the Title page of the patent:

The Foreign Application Priority Data is missing.

(30) Foreign Application Priority Data should read --August 29, 2001 (EP) 01203255.3--.

Additionally, the Related U.S. Application Data is missing.

(63) Related U.S. Application Data should read --Division of Application No. 10/227,669, filed on August 26, 2002, now Patent No. 6,731,360--.

Signed and Sealed this

Sixth Day of July, 2010

David J. Kappos
*Director of the United States Patent and Trademark Office*